(12) United States Patent
Lee

(10) Patent No.: US 6,809,646 B1
(45) Date of Patent: Oct. 26, 2004

(54) THIN IMPLANTABLE RFID TRANSPONDER SUITABLE FOR USE IN AN IDENTIFICATION BADGE

(75) Inventor: Donny V. Lee, Northport, NY (US)

(73) Assignee: Applied Wireless Identifications Group, Inc., Monsey, NY (US)

( * ) Notice: Subject to any disclaimer, the term of this patent is extended or adjusted under 35 U.S.C. 154(b) by 68 days.

(21) Appl. No.: 10/298,462

(22) Filed: Nov. 18, 2002

Related U.S. Application Data

(60) Provisional application No. 60/336,379, filed on Dec. 6, 2001.

(51) Int. Cl.[7] .............................................. G08B 13/14
(52) U.S. Cl. .................. 340/572.1; 235/487; 340/572.8
(58) Field of Search ........................... 340/572.1, 572.7, 340/572.8, 5.8, 5.81; 235/382, 487; 29/825, 829; 257/679

(56) References Cited

U.S. PATENT DOCUMENTS

| | | | | |
|---|---|---|---|---|
| 5,574,470 A | * | 11/1996 | de Vall | 340/572.7 |
| 6,025,784 A | * | 2/2000 | Mish | 340/693.5 |
| 6,206,292 B1 | * | 3/2001 | Robertz et al. | 235/488 |
| 6,248,199 B1 | * | 6/2001 | Smulson | 156/244.12 |
| 6,466,131 B1 | * | 10/2002 | Tuttle et al. | 340/572.7 |
| 2002/0041234 A1 | * | 4/2002 | Kuzma et al. | 340/572.8 |
| 2003/0106455 A1 | * | 6/2003 | Weston | 104/53 |

* cited by examiner

Primary Examiner—Thomas J Mullen, Jr.
(74) Attorney, Agent, or Firm—Mark Levy & Associates, PLLC; David L. Banner

(57) ABSTRACT

There is provided an RFID transceiver, typically in the form of a prox-wafer. The transceiver is suitable for lamination or encapsulation into newly manufactured identification (ID) badges and similar articles. These ID badges are suitable for identifying and/or authenticating a person or object when used in conjunction with an RFID identification system. The proximity badges formed using the RFID transceivers are superior to conventional magnetic stripe, bar code, or "smart chip" badges because no direct contact with a badge reader is required and the element containing the identification code is not easily corrupted.

14 Claims, 2 Drawing Sheets

THIN IMPLANTABLE RFID TRANSPONDER SUITABLE FOR USE IN AN IDENTIFICATION BADGE

RELATED APPLICATIONS

This application claims priority in accordance with 35 U.S.C. §119 to U.S. Provisional Patent Application Ser. No. 60/336,379, filed Dec. 6, 2001.

FIELD OF THE INVENTION

The present invention relates to Radio Frequency Identification (RFID) systems and, more particularly, to a small implantable or encapsulatable RFID transponder suitable for attachment to existing badges (e.g., employee ID badges, etc.) or for incorporation in newly manufactured badges. A method for efficient transition from an older identification badge system to an RFID-based proximity badge system is also provided.

BACKGROUND OF THE INVENTION

Identification (ID) badges are routinely used to identify people and objects. Typically, these badges are used in cooperation with an access control system to ensure only authorized personnel or objects are admitted to a particular facility or area. Such access control systems usually rely on identification information encoded on a magnetic strip of the ID badge, a scannable bar code imprinted on the ID badge, or a "smart" chip embedded in the badge. Each of these types of information carriers suffers from at least one disadvantage. Magnetic strips are easily damaged and may quickly become unreadable in one or more access point badge readers. Likewise, bar codes may become unreadable because of mutilation or dirt covering them. ID badges having smart chips require direct electrical interconnection with a reader and contacts on the card and/or the reader, and may easily become dirty, thereby rendering the badge unreliable.

These problems may all be overcome by using an information carrier that does not require direct contact with a reader and carries information in a relatively indestructible manner. These types of identification devices are known as proximity badges.

The present invention provides a Radio Frequency Identification (RFID) transponder suitable for inclusion on either existing ID badges or in or on new badges. The ability to retrofit an RFID transponder onto the face of an existing ID badge can save an employer, agency, or other ID issuing entity significant time and cost.

Typically a re-badging process is undertaken when a smaller company is bought out by a larger company, two companies merge and one or both undergo a name change, a new company "look" (i.e., colors, logo, etc.) is being implemented, or other numerous reasons unrelated to the invention. The process usually requires all badged personnel (i.e., employees, contractors, etc.) to make an appointment with the Human Relations office or other badge issuing entity for a photo session. Photos must then be processed and merged with information, and ultimately the new ID badge must be printed, laminated, and issued. While the cost of the badges usually is small, the time each employee uses for the process costs the issuing agency significant money. One estimate is that the wasted employee time is five to ten times the actual cost of an RFID ID badge. This high overhead cost is a significant factor in keeping owners and managers from switching to a newer, high-reliability ID badge technology such as RFID.

SUMMARY OF THE INVENTION

The present invention features an RFID transponder suitable for use in laminated or encapsulated ID badges or similar structures. In addition, the inventive RFID transponder may be retrofitted onto existing ID badges thereby providing an easy transition to a high-reliability identification technology without the usual overhead associated with a re-badging process.

It is therefore an object of the invention to provide an RFID transponder suitable for lamination, encapsulation, or simple stick-on into a structure such as an ID badge.

It is another object of the invention to provide an RFID transponder suitable for use in proximity ID badges.

It is an additional object of the invention to provide an RFID transponder suitable for retroactively adding to existing ID badges.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE PREFERRED EMBODIMENT

The advantages of using a proximity technology for identification (ID) cards, tags, badges, etc. cannot be overestimated. Using proximity technologies, high-durability, high-reliability and secure identification tags, badges, etc., may be fabricated. The identification badges of the instant invention use a Radio Frequency Identification (RFID) technology. The term badge shall be used herein to refer to any relatively thin identification tag, card, badge, or similar structure typically used to identify or authenticate a person or object.

Figure 1:
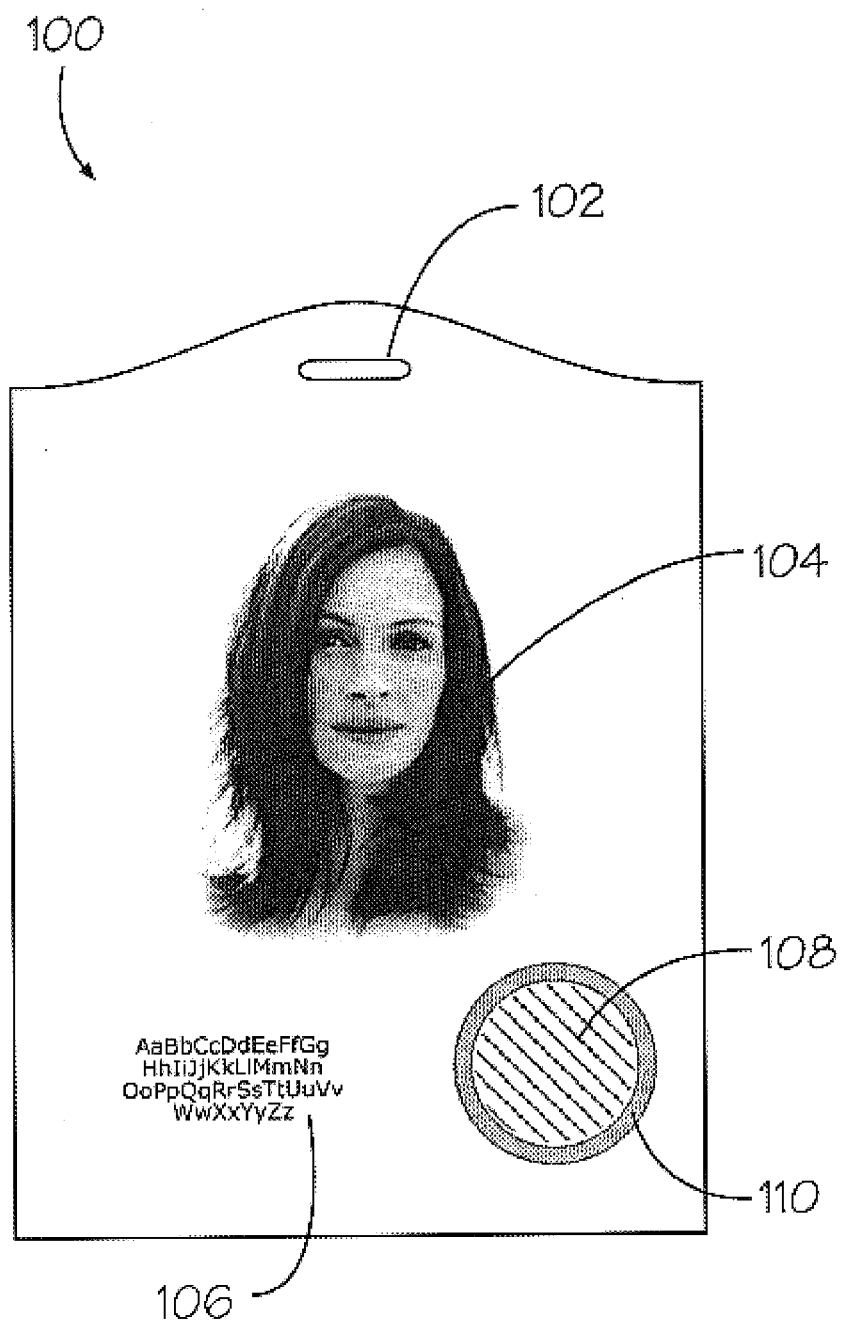
FIG. 1 is a schematic plan view of a badge having an RFID transponder mounted on a surface thereof in accordance with the present invention.

Referring to FIG. 1, a plan view of a typical ID badge 100 is shown. An aperture 102 with an attachment clip, lanyard, etc. (not shown) for attaching the badge 100 to a person (not shown) or another object to be identified (not shown) is provided. Typically, the badge 100 will include a photo 104 and other indicia 106 (i.e., written or graphic material) shown disposed in the lower left corner-of the badge 100. Indicia 106 could, of course be located in other areas of the badge 100, typically appearing in many diverse regions on the-face or, in some cases, also on the back (not shown) of the badge 100.

Figure 2:
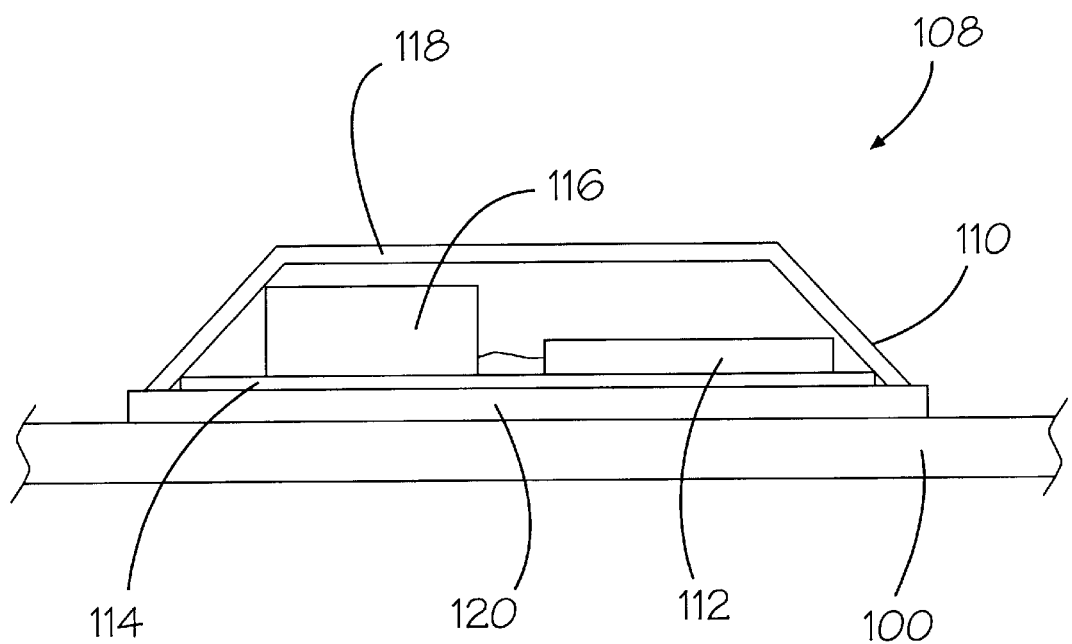
FIG. 2 is a schematic sectional view of an RFID transponder (i.e., prox-wafer) as shown on the badge of FIG. 1.

Also attached to a front face of the badge 100 is an RFID transponder (i.e., proximity wafer or "prox-wafer") 108. A suitable prox-wafer is provided by Applied Wireless ID (AWID) of Monsey, N.Y. as its Prox-Linc™ product. The RFID transponder 108 typically has a beveled edge 110 to present a substantially smooth interface between the front surface of the badge 100 and the transponder 108. It will be recognized that edge treatments other than a bevel 110 could be applied to the transponder 108. The transponder 108 is typically a passive RFID transponder although an active RFID transponder could be used in alternate embodiments. The transponder 108 used for purposes of disclosure incorporates an internal antenna 112 (FIG. 2). This facilitates the retrofitting of the transponder 108 to the existing badge 100. In alternate embodiments, the antenna 112 could be located externally to the transponder 108 and could be disposed in an interior portion of the badge 100. The RFID transceiver 108 may be either a half duplex or full duplex device as required for a particular RFID identification system.

Referring to FIG. 2, a schematic sectional view of the transponder 108 is shown. The RFID transponder 108 used for purposes of disclosure is a thin, circular structure having a diameter approximately that of a quarter (coin). The thickness of the transponder 108 is approximately one half the thickness of a quarter, the same thickness as a typical debit or credit card. It will be recognized that transponders having other sizes, shapes, and/or thicknesses could also be used in the application to meet a particular operating requirement or environment. The transponder 108 typically contains a substrate 114, an RFID identification signal processing circuit 116 having an antenna 112 electrically connected thereto. A case 118 encloses the aforementioned components of the transponder 108. Typically, the case 118 is sealed to the substrate 114 with an epoxy seal (not shown); of course, other suitable sealant materials may be used.

In alternate embodiments, the case 118 could be an epoxy cap encapsulating the aforementioned components to the substrate 114. In retrofit applications, the transponder 108 is typically affixed to the face of the badge 100 using a layer of adhesive 120 placed between the rear surface of the substrate 114 and the face of the badge 100. Any adhesive suitable for retaining the transponder 108 to the face of the badge 100 may be used. It will be recognized that other methods of affixing the transponder 108 to the badge 100 could be utilized to meet a particular operating requirement or environment.

The operation of RFID identification systems is well understood. The addition of the RFID transponder 108 to a badge 100, either by retrofitting an existing badge or embedding a transceiver 108 within a new badge at the time of manufacture, creates a badge that uniquely perturbs a radio frequency (RF) field emitted by an RFID reader (not shown). The unique perturbance of the RF field is interpreted by the RFID reader (not shown) as a unique identification associated only with a particular RFID transponder 108 that, in turn, is associated with a specific person or object.

Since other modifications and changes varied to fit particular operating conditions and environments or designs will be apparent to those skilled in the art, the invention is not considered limited to the examples chosen for purposes of disclosure, and covers changes and modifications that do not constitute departures from the true scope of this invention.

Having thus described the invention, what is desired to be protected by Letters Patent is presented in the subsequently appended claims.

What is claimed is:

1. An RFID transponder for upgrading an existing identification badge, comprising:
   a) a substrate having an upper surface and a lower surface;
   b) an RF identification signal processing circuit disposed proximate said upper surface of said substrate;
   c) an antenna electrically connected to said signal processing circuit and disposed proximate said upper surface of said substrate; and
   d) adhesive means operatively connected to said lower side of said substrate for attaching said transponder to an existing identification badge.

2. The transponder in accordance with claim 1, wherein said substrate, said signal processing circuit, and said antenna define a prox-wafer.

3. The transponder in accordance with claim 2, wherein said prox-wafer is one of the shapes: substantially circular, substantially rectangular, and polygonal.

4. The transponder in accordance with claim 3, wherein at least one edge or part of the edge of said prox-wafer is beveled.

5. The transponder in accordance with claim 3, further comprising epoxy bonding for sealing said signal processing circuit and said antenna and for forming a cap.

6. The transponder in accordance with claim 1, wherein said signal processing circuit comprises at least one of: a half-duplex transponder circuit and a full-duplex transponder circuit.

7. The transponder in accordance with claim 1, wherein said signal processing circuit comprises at least one of the circuit types: an active transponder circuit and a passive transponder circuit.

8. A badge for identifying an equipment operator, a service person or an employee, comprising:
   a) a substantially planar, substantially rectangular, laminated card; and
   b) a transponder adhesively attached to said laminated card, said transponder comprising:
      i) a substrate having an upper surface and a lower surface;
      ii) an RF identification signal processing circuit disposed proximate said upper surface of said substrate; and
      iii) an antenna electrically connected to said signal processing circuit and disposed proximate said upper surface of said substrate.

9. The badge in accordance with claim 8, wherein said substrate, said signal processing circuit, and said antenna define a prox-wafer.

10. The badge in accordance with claim 9, wherein said prox-wafer is one of the shapes: substantially circular, substantially rectangular, and polygonal.

11. The badge in accordance with claim 10, wherein at least one edge or part of the edge of said prox-wafer is beveled.

12. The badge in accordance with claim 9, further comprising epoxy bonding for sealing said signal processing circuit and said antenna and for forming a cap.

13. The badge in accordance with claim 8, wherein said signal processing circuit comprises at least one of the circuit types: half-duplex transponder circuit, and full-duplex transponder circuit.

14. The badge in accordance with claim 11, wherein said signal processing circuit comprises at least one of the circuit types: an active transponder circuit, and a passive transponder circuit.

* * * * *